US009117172B2

(12) United States Patent
Reznichek et al.

(10) Patent No.: US 9,117,172 B2
(45) Date of Patent: Aug. 25, 2015

(54) OPTIMISATION OF RESOURCE MANAGEMENT USING PERFECT KNOWLEDGE BIAS

(71) Applicant: Manitoba Hydro, Winnipeg (CA)

(72) Inventors: Karl Reznichek, Winnipeg (CA); Jacob Quinton Snell, Winnipeg (CA)

(73) Assignee: Manitoba Hydro, Winnipeg, Manitoba (CA)

( * ) Notice: Subject to any disclaimer, the term of this patent is extended or adjusted under 35 U.S.C. 154(b) by 323 days.

(21) Appl. No.: 13/904,429

(22) Filed: May 29, 2013

(65) Prior Publication Data

US 2014/0156585 A1    Jun. 5, 2014

Related U.S. Application Data

(60) Provisional application No. 61/654,376, filed on Jun. 1, 2012.

(51) Int. Cl.
*G06N 5/02*        (2006.01)

(52) U.S. Cl.
CPC ........................ *G06N 5/02* (2013.01)

(58) Field of Classification Search
None
See application file for complete search history.

(56) References Cited

U.S. PATENT DOCUMENTS

2006/0106743 A1* 5/2006 Horvitz ........................ 706/21
2009/0157573 A1* 6/2009 Anderson et al. ............. 706/12

OTHER PUBLICATIONS

Islam et al, An Empirical Study into Adaptive Resource Provisioning in the Cloud, 2010.*

* cited by examiner

*Primary Examiner* — Jeffrey A Gaffin
*Assistant Examiner* — Mikayla Chubb
(74) *Attorney, Agent, or Firm* — Ryan W. Dupuis; Kyle R. Satterthwaite; Ade & Company Inc.

(57) ABSTRACT

Methods and computer implemented systems for evaluation and optimisation of methods used for forecasting, modeling, valuation, and decision-making, in staged resource planning are provided. Fundamentally, a universal comparator that accounts for perfect decision differencing (PERNOB) is determined and used for evaluating benefits associated with the use of prediction method-sets and decision-making method-sets in staged resource planning. According to one application, PERNOB is used to evaluate different prediction method-sets and decision-making method-sets and enable the selection of optimal method-sets corresponding to a given situation. According to another application, PERNOB is used to create an unbiased operational decision making environment through realistic re-valuation of system resource(s).

20 Claims, 2 Drawing Sheets

OPTIMISATION OF RESOURCE MANAGEMENT USING PERFECT KNOWLEDGE BIAS

This application claims the benefit under 35 U.S.C. 119(e) of U.S. provisional application Ser. No. 61/654,376, filed Jun. 1, 2012.

FIELD OF THE INVENTION

The present invention relates in general to the evaluation and optimisation of methods used for forecasting, modeling, valuation, and decision-making, in staged resource planning, through the determination and use of a universal comparator that accounts for perfect knowledge bias (PERNOB).

BACKGROUND

The inherent advantages of having perfect knowledge of the future in resource management is obvious in that if a resource manager can know exactly how much a limited resource will be available at a given time in the future, and how much demand for that resource that needs to be satisfied at that time, then the best possible decision can be made so to maximise economic benefits that would result from the optimal use of that available resource to satisfy that demand.

In real-life practice, however, having perfect knowledge of the future is not a present reality, and resource managers have to rather rely on modeling and predictions as to the future availability of resources as well as the future demand for or expenditures of the resources.

The number of approaches and methodologies for generating predictions of the future is diversely plentiful, but one commonality amongst all of them is that they can only generate estimates based on imperfect knowledge of the future at the time of prediction.

For operations or systems of any complexity, computer modeling is a convenient means that resource managers can use to generate a mathematical representation (model) of a given operation or system. Depending on complexity, a system can comprise of many interacting subsystems, with the corresponding system model comprising of many interacting submodels.

The representation of the system at a given time is commonly referred to as the "state" of the system for that time. The modeled system would take into account a plethora of factors (or variables) that influences and constrains the modeled system, and it is the changes in these variables over time that evolves the system model from one mathematical state to another mathematical state (hence the term "state variables"). The time interval between one state of the modeled system to another state in computer simulation is commonly referred to as a "stage" or a "time-step".

Some of these state variables are dependent variables inherent within the modeled system, while others are independent variables that can include external influences and/or constraints that have to be inputted into the modeled system. In resource management modeling, one or more state variables could represent the level or amount of one or more resources of interest to the resource manager, while other state variable(s) of the model could be the level or amount of demand for such resource(s). It is the changes in these state variables across time-steps in a modeled system that provide a resource manager with the information required for making decisions as to how best to valuate, allocate, and deploy, the resource(s) available to satisfy demand at a given time and maximize economic benefits that would result from same.

When a resource manager is using a system model to determine future availability of, or demand for, a given resource without perfect foreknowledge, at least some of these input variables would have to be predictions based on imperfect knowledge of the future and made using any of the aforementioned diverse selection of forecast methods. Of course, when any of the input variables are predictions or estimates based on imperfect knowledge of the future, they would be subject to inherent uncertainty and inaccuracy. Consequently, the output state variables in terms of resource availability and/or demand would likewise contain inherent uncertainty and inaccuracy. As such, any valuation of resources and any decision made based on any erroneous information would be suboptimal, and the deleterious effects of making suboptimal valuation and/or decisions repeatedly over a number of stages or time-steps can be amplified and have profound adversity on the overall economic benefits that would be realized.

Resource management models can be deterministic or stochastic. Deterministic models require that all future inputs need to be supplied with "certainty" for the formulation of the model problem; they also called scenario planning models. Stochastic (or probabilistic) models, on the other hand, directly accommodate "uncertainty" of inputs by requiring a probabilistic representation (e.g. statistical distribution) of every uncertain input and can thereby generate outputs given with confidence intervals.

As mentioned above, resource management modeling of operations or systems commonly requires the formulation of large number of influences and constraints. This requirement can significantly limit the selection of available mathematical programming techniques that can perform the task, and it can also place an inordinate amount of computational burden and modeling time. Due to these reasons, a deterministic problem formulation is oftentimes used for resource management modeling of large and/or complex operations or systems, although stochastic modeling is also becoming increasingly viable with our continuing advances in computational technologies.

Regardless of deterministic or stochastic modeling, either situation would still require formulation of input scenarios (considering for all influences and constants) to provide a vision of the future; and when input scenarios (whether finite or probabilistic) are simply predictions based on imperfect foreknowledge, the resulting error within the predicted outputs, such as availability of resources or future demand, can mislead the resource manager to assume inappropriate risk levels and thereby resulting in decisions that produce unrealistic net benefits and/or costs.

In reality all time-related planning processes must in some fashion consider time-related uncertainties in order to improve decision making. A number of the more sophisticated resource management models have the programmed ability to automatically provide recommendations to the resource manager on how best to valuate, allocate, and deploy, resources of interest to activities that would maximize economic benefit and/or minimize cost over planning periods. These models can be applied to planning the operation and expansion of assets and resource in many industries including complex electrical utility systems, and they have to take into consideration a tremendous variety and number of state variables, notwithstanding the added algorithms to enable automated formulation of decision(s) based on applicable state variables at each time-step. The accuracy and actual value of the any decision made, regardless of level of sophistication of the decision making algorithms, would hinge upon the accuracy of the input state variables and cannot escape the inevitable "garbage-in-garbage-out" idiom. That said, the selection of and reliance on suboptimal decision formulation methodology, regardless of however perfect and accurate the predictions are, would still yield suboptimal decisions and compromised economic benefits.

Similar to the fact that there are many different methods for making predictions on state variables, there are also diverse approaches and methods for formulation of decisions based on any given state of a system. Oftentimes, a resource manager may use different decision formulation methodologies and algorithms to variably compensate for the suspected degrees of error caused by inaccurate prediction of input state variables, and as such, very different decisions (e.g. in terms of course of action respecting valuation, allocation, or deployment, of available resources) can be reached even for a single state of the modeled system.

At the end, with the multitude of approaches and methodologies for both prediction of input state variables, matrixed with the multitude of approaches and methodologies for decision formulation (including resource valuation), resource managers are commonly left with the question as to which combination of prediction method vs. decision formulation method should be adopted/matched so that economic benefits are indeed maximized.

An examination of the prior art has revealed numerous different methods that resource managers can use to evaluate a given prediction method or a given decision formulation method, but this piecemeal approach would be time consuming, and perhaps more importantly, it cannot be used to holistically or systemically evaluate different combinations and permutations of prediction methods and decision formulation methods. Further, a resource manager would now be saddled with yet another layer of uncertainty in decision-making in terms of which evaluation methodology would be best and should be used, and the quagmire worsens.

Yet further, resource managers are often required to plan for different time frames or time scales (e.g. hourly, weekly, monthly, and multiyear planning), and as such, their operations and systems are simulated using models that run on different time horizons and time-steps. Ultimately, at any given point in time, the longer-term predictions in terms of resource availability and resource demand would feed into the shorter term predictions which would eventually drive present-time evaluation of resource, formulation of decisions on resource allocation and deployment, and execution of resulting decisions to generate corresponding economic benefits.

As such, it is important that approaches and methods used for predicting resource availability in the more distant future are comparable and compatible (e.g. in terms of method bias and accuracy) with approaches and methods used for predicting resource availability in the near future. At a given demand level, an over-abundance of resource can lead to under-valuation of said resource and vice versa, and any mismatch in valuation of a given resource at the boundary between two different time frames would be confusing and not very helpful for the resource manager.

So in order to improve the utility of the economic results from deterministic modeling, there is therefore a need for a more practicable and more universal solution that can help resource managers meaningfully evaluate and select optimal methods for prediction as well as methods of decision formulation for their respective situations and purposes.

SUMMARY OF THE INVENTION

In view of the foregoing disadvantages of the prior art, the present invention provides resource managers with a novel method for evaluation of different methods of making predictions for system modeling so that they can determine and select optimal methods to generate prediction value sets that would situationally meet the level of accuracy required.

Similarly, the novel method of the present invention also enables resource managers to evaluate different methods of making decisions based on the state outputs of system modeling so that they can also situationally and systemically determine and select optimal methods to generate decisions that would maximise economic benefits from the optimal valuation, allocation, and deployment, of available resources in respect of demand for such resources vis-à-vis the prediction methodology they used. Further, the method of the present invention also provides a formalized mechanism by which valuation of the eventual output variable(s) (e.g. resource(s)) of a staged resource planning system can be re-rated so to mitigate decision bias.

An object of the present invention is to provide a novel method for systemic evaluation and selection of methods used for predicting state variables in system modeling and methods used for formulating decisions regarding resource valuation, allocation, and deployment. The method of the present invention is based on the determination and use of a comparative index that accounts for differences between perfect vs. imperfect foreknowledge and decision-making, or perfect decision differencing (PERNOB).

According to a first aspect of the present invention there is provided a computer-implemented method for evaluating at least one prediction and decision method set comprising a prediction method and a decision making method for staged resource planning and modeling of a system, the method comprising:

i) generating a first predicted value set comprising at least one state variable by applying the prediction method of said at least one prediction and decision method set to an initial state of the system for a first stage having a prescribed duration whereby the first predicted value set represents a predicted availability of at least one system resource and a predicted demand of at least one system resource for the first stage;

ii) applying the decision making method of said at least one prediction and decision method set to the first predicted value set to generate a first imperfect decision as to how said at least one system resource should be utilized;

iii) observing a first actual value set of the system through the first stage which represents an actual availability of said at least one system resource and an actual demand for said at least one system resource for the first stage;

iv) determining according to the first actual value set a first perfect decision corresponding to a utilization of said at least one system resource which optimises benefit;

v) determining a first perfect benefit by application of the first perfect decision to the first actual value set;

vi) determining a first predicted benefit by applying the first imperfect decision of said at least one prediction and method set to said first actual value-set;

vii) generating a first rating set for said at least one prediction and decision method set by comparing the first predicted benefit of said at least one prediction and decision method set to the first perfect benefit.

Preferably the first predicted value set and first imperfect decision are generated after the first actual value-set for the first stage has been observed.

Preferably there is provided a plurality of prediction and decisions sets in which at least one of the prediction and decision method sets includes a prediction method which is different than another one of the prediction and decision method sets and in which at least one of the prediction and decision method sets includes a decision making method which is different than another one of the prediction and decision method sets.

The rating set is preferably expressed as a relative measure of deviation of the imperfect benefit from the perfect benefit.

Preferably the first stage comprises one or more time step iterations of said at least one prediction and decision method set.

In this instance, preferably each prediction and decision method set is arranged to be executed a respective prescribed number of time step iterations during the prescribed duration of first stage such that all of the rating sets of the plurality of prediction and decision method sets are generated over a common prescribed duration of the first stage.

In some instances one or more of the plurality of prediction and decision method sets is arranged to be executed a different prescribed number of time step iterations during the first stage than another one of the plurality of prediction and decision method sets such that the prediction and decision method sets are pro-rated to the common prescribed duration of the first stage.

In one instance the method preferably further comprises comparing the rating set of at least one of the prediction and decision method sets to the rating set of another one of the prediction and decision method set. The method may yet further comprise selecting the rating set with a lower magnitude to yield optimal benefits from the utilization of the resource.

Preferably the method also includes the further steps of:

i) determining a first actual state of the system at the end of the first stage;

ii) generating a second predicted value set comprising at least one state variable by applying the prediction method of said at least one prediction and decision method set to the first actual state of the system for a second stage having a prescribed duration whereby the second predicted value set represents a predicted availability of at least one system resource and a predicted demand of at least one system resource for the second stage;

iii) applying the decision making method of said at least one prediction and decision method set to the second predicted value set to generate a second imperfect decision as to how said at least one system resource should be utilized;

iv) observing a second actual value set of the system through the second stage which represents an actual availability of said at least one system resource and an actual demand for said at least one system resource for the second stage;

v) determining according to the second actual value set a second perfect decision corresponding to a utilization of said at least one system resource which optimises benefit;

vi) determining a second perfect benefit by applying the second perfect decision to the second actual value set;

vii) determining a second predicted benefit by applying the second imperfect decision of said at least one prediction and method set to said second actual value-set; and viii) generating a second rating set for said at least one prediction and decision method set by comparing the second predicted benefit of said at least one prediction and decision method set to the second perfect benefit.

The predicted value-sets and the imperfect decisions are preferably generated after the second actual value set for the second stage has been observed.

The method preferably further comprises generating an overall rating set based on a function of the first rating set and the second rating set for said at least one prediction and decision method set, and more preferably comparing the overall rating set of one prediction and decision method set to the overall rating set of another prediction and decision method set.

When each rating set represents a difference between predicted and perfect benefits, the method preferably includes determining which one of the prediction and decision method sets has a lowest overall rating set to yield optimal benefits from the utilization of the resource.

The comparison of rating sets may further comprise comparison of a statistical distribution of the overall rating set of one prediction and decision method set to a statistical distribution of the overall rating set of another prediction and decision method set.

The method may also include determining which of the prediction and decision method sets has first and second rating sets which are most similar to one another over the first and second stages, for example by comparing a measure of central tendency of one rating set to a measure of central tendency another rating set.

The method may further comprise statistically comparing a central tendency and variance of the rating sets of different prediction and decision method sets to one another.

Even when each prediction and decision method sets is arranged to be executed a respective prescribed number of time step iterations during the prescribed duration of first stage, preferably all of the rating sets of the plurality of prediction and decision method sets are generated over a common prescribed duration of the first stage and the second stage.

According to another aspect of the present invention there is provided a computer-implemented method for evaluating at least one prediction method set comprising a prediction method and decision method for staged resource planning and modeling of a system, the method comprising:

i) Generating, using a prediction method-set, a "first predicted value-set" (based on imperfect foreknowledge) for at least one state-variable(s) of the system model, and running the model for a "first stage" of a "first time duration" starting as at a user-selected "initial actual state" of the system; and thereby revealing the predicted availability of at least one system resource(s) and the predicted demand for same at least one system resource(s) for the "first stage";

ii) Based on the "first predicted value-set", using a "decision-making method-set" to generate a "first imperfect decision" as to how the at least one system resource(s) should be valuated and utilized;

iii) Observing the actual system and the "first actual value-set" of the system through the "first stage", and thereby revealing the actual availability of the at least one system resource(s) and the actual demand for same at least one system resource(s) for the "first stage";

iv) Generating a "first perfect decision" based on the "first actual value-set" to best valuate and utilize the at least one system resource(s) that is actually available to optimise benefit from utilization of the at least one system resource(s); Implementing the "first imperfect decision" based on the "first actual value-set" (and not the "first predicted value-set") of the system, and deducing therefrom a resulting "first predicted benefit";

v) Implementing the "first perfect decision" based on the "first actual value-set" of the system, and deducing therefrom a resulting "first perfect benefit"; and vi) Generating a "first PERNOB value-set" for the combination of prediction method-set and decision-making method-set based on the difference between the "first predicted benefit" and the "first perfect benefit".

The "first predicted value-set" and "first imperfect decision" may be generated after the "first actual value-set" for the "first stage" have been observed, that is after the actual availability of the at least one system resource(s) and the actual demand for same at least one system resource(s) for the "first stage" have been revealed.

The method preferably further comprises the steps of generating another "first PERNOB value-set" for the same first stage using the foregoing steps but with a different combination of prediction method-set, decision-making method-set, and time duration in which the "first PERNOB value-set" generated using the first combination and the "first PERNOB value-set" generated using the second combination are pro-rated to a common time duration.

The method may also include comparing the "first PERNOB value-set" generated using the first combination against the "first PERNOB value-set" generated using the second combination, and selecting the combination of prediction method-set and decision-making method-set with the lower PERNOB value-set to yield optimal benefits from the utilization of the resource.

The method may yet further comprise the steps of:

i) Deducing a "first actual state" of the system as at the end of the first stage from the implementation of the "first perfect decision" based on the "first actual value-set" of the system;

ii) Generating, using a prediction method-set, a "second predicted value-set" (based on imperfect foreknowledge) for at least one state-variable(s) of the system model, and running for a "second stage" of a "second time duration", said model starting as at the "first actual stage"; and thereby revealing the predicted availability of the at least one system resource(s) and the predicted demand for same at least one system resource(s) for the "second stage";

iii) Based on the "second predicted value-set", using a "decision-making method-set" to generate a "second imperfect decision" as to how the at least one system resource(s) should be valuated and utilized;

iv) Observing the actual system and the "second actual value-set" of the system through the "second stage", and thereby revealing the actual availability of the at least one system resource(s) and the actual demand for same resource(s) for the "second stage";

v) Generating a "second perfect decision" based on the "second actual value-set" to best valuate and utilize the resource(s) that is actually available to maximize benefit from utilization of the at least one system resource(s);

vi) Implementing the "second imperfect decision" based on the "second actual value-set" (and not the "second predicted value-set" of the system, and deducing therefrom a resulting "second predicted benefit";

vii) Implementing the "second perfect decision" based on the "second actual value-set" of the system, and deducing therefrom a resulting "second perfect benefit";

viii) Generating a "second PERNOB value-set" for the combination of prediction method-set and decision-making method-set based on the difference between the "second predicted benefit" and the "second perfect benefit".

Preferably the "predicted value-sets" and the "imperfect decisions" are generated after the "second actual value-set" for the "second stage" have been observed, that is after the actual availability of the at least one system resource(s) and the actual demand for same at least one system resource(s) for the "second stage" have been revealed.

The prediction method-set used to generate the "first predicted value-set" and the prediction method-set used to generate the "second predicted value-set" may be the same or different.

Similarly, the decision-making method-set used to generate the "first imperfect decision" and the decision-making method-set used to generate the "second imperfect decision" may be the same or different.

Also, the "first time duration" and the "second time duration" may be the same or different. If different, the PERNOB value-set generated for the "first stage" and the PERNOB value-set generated for the "second stage" are pro-rated to a common time duration.

When comparing the PERNOB value-sets generated using the first combination of prediction method-set, decision-making method-set, and time duration, against the PERNOB value-sets generated using the second combination of prediction method-set, decision-making method-set, preferably the combination of prediction method-set and decision-making method-set with the lower PERNOB value-sets is selected so as to yield optimal benefits from the utilization of the resource. The comparison may comprise a statistical distribution of one PERNOB value-set compared to a statistical distribution of another PERNOB value-set, or a statistical comparison of the central tendency and variance of the respective PERNOB value-sets generated using different combinations of prediction method-set and decision-making method-set.

Other objects, features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying drawings there are illustrated the fundamental methods for generating rating values for prediction method-sets and decision-making method sets for different scenarios in which the rating values are referred to herein as PERNOB values which represent ratings which are represent PERfect kNOwledge Bias (PERNOB).

Figure 1:
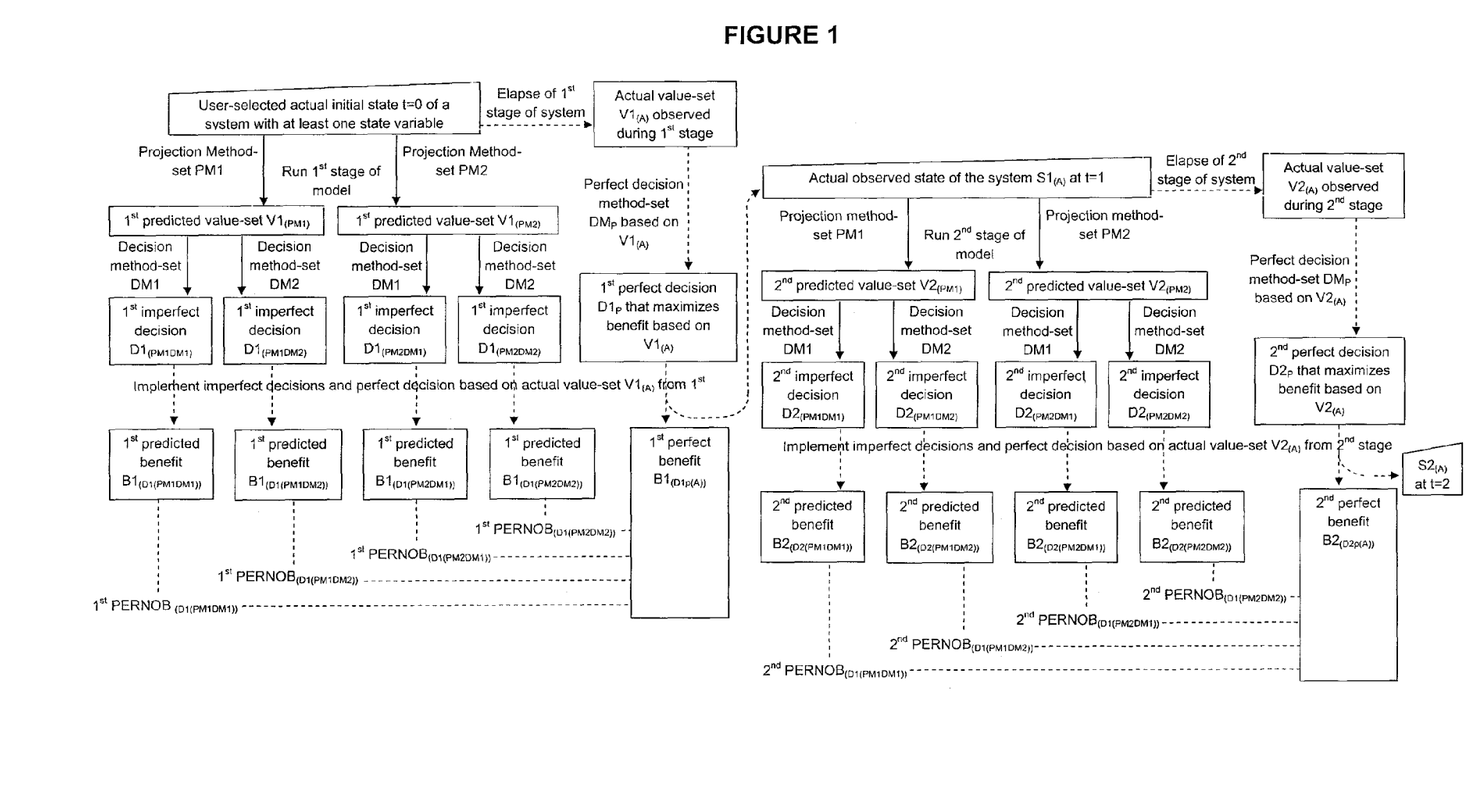
FIG. 1 is a diagrammatic representation depicting the determination of PERNOB values for two prediction method-sets used in combination with two decision-making method-sets, over two stages or time-steps (as example of a multi-staged model.

FIG. 1 is a depiction of a scenario where resource managers can use the method of the present invention to evaluate and compare different methods of making predictions for system modeling and different methods of making decisions so that they can determine and select, respectively, optimal methods to generate prediction value sets that would situationally meet the level of accuracy required, and optimal methods to generate decisions that would maximise economic benefits from the optimal valuation, allocation, and deployment, of available resources in respect of demand for such resources vis-à-vis the prediction methodology they used.

For ease of illustration, only two prediction method-sets and two decision-making method-sets are shown in FIG. 1, and PERNOB values are only generated for two stages of the model. Accordingly, it should be readily apparent to a skilled person in the art that the method can be used to generate PERNOB values for more than two prediction method-sets and/or two decision-making method-sets, and that additional stage(s) of the model can be performed to generate additional PERNOB value-set(s) by re-iterating the described steps mutatis mutandis. Of course, repetition of the described process for additional stages would allow a resource manager to extend the time-horizon of the modeling (if the time duration of each stage is unchanged), or conversely, reducing the time duration of each stage and performing more iterations can yield the benefit of improving time-resolution of the model.

It should also be readily apparent to a skilled person in the art that each "prediction method-set" as mentioned may represent one prediction method or may comprise of more than one prediction method. Similarly, "decision-making method-set" as mentioned likewise may represent one decision-making method or may comprise of more than one decision-making method.

In terms of stage(s), each "stage" as mentioned may represent one time step or time interval, or it may comprise multiple time steps or time intervals. Obviously, the time duration of different stages may be the same or it may be different.

According to the illustration, when different prediction method-sets and different decision-making method-sets are of option, the method used to evaluate each combination of prediction method-set and different decision-making method-set is as follows:

i) Generating, using each prediction method-set (PM1 or PM2), a respective "first predicted value-set" (based on imperfect foreknowledge) for at least one state-variable(s) of the system model ($V1_{(PM1)}$ and $V1_{(PM2)}$), and running the model for a "first stage" of a "first time duration" starting as at a user-selected "initial actual state" (t=0) of the system; and thereby revealing for each prediction method-set the predicted availability of at least one system resource(s) and the predicted demand for same at least one system resource(s) for the "first stage";

ii) Based on each "first predicted value-set" ($V1_{(PM1)}$ or $V1_{(PM2)}$), using each "decision-making method-set" (DM1 or DM2) to generate a respective "first imperfect decision" ($D1_{(PM1DM1)}$, $D1_{(PM2DM1)}$, $D1_{(PM1DM2)}$, and $D1_{(PM2DM2)}$) as to how the at least one system resource(s) should be valuated and utilized;

iii) Observing the actual system and the "first actual value-set" ($V1_{(A)}$) of the system through the "first stage", and thereby revealing for each prediction method-set the actual availability of the at least one system resource(s) and the actual demand for same at least one system resource(s) for the "first stage";

iv) Generating a "first perfect decision" ($D1_{(P)}$) based on the "first actual value-set" ($V1_{(A)}$) to best valuate and utilize the at least one system resource(s) that is actually available to optimise benefit from utilization of the at least one system resource(s);

v) Implementing each "first imperfect decision" ($D1_{(PM1DM1)}$, $D1_{(PM2DM1)}$, $D1_{(PM1DM2)}$, or $D1_{(PM2DM2)}$ based on the corresponding "first actual value-set" ($V1_{(A)}$) (and not the "first predicted value-set" ($V1_{(PM1)}$ or $V1_{(PM2)}$)) of the system, and deducing respectively therefrom a resulting "first predicted benefit" ($B1_{(D1(PM1DM1))}$, $B1_{(D1(PM1DM2))}$, $B1_{(D1(PM2DM1))}$, or $B1_{(D1(PM2DM2))}$) for each "first imperfect decision" ($D1_{(PM1DM1)}$, $D1_{(PM2DM1)}$, $D1_{(PM1DM2)}$, or $D1_{(PM2DM2)}$);

vi) Implementing the "first perfect decision" ($D1_{(P)}$) based on the "first actual value-set" of the system ($V1_{(A)}$), and deducing therefrom a resulting "first perfect benefit" ($B1_{(D1(P))}$) and a "first actual state" ($S1_{(A)}$) of the system as at the end of the first stage, wherein the first perfect decision and the first perfect benefit are typically the result of an optimization algorithm applied to the first actual value set of the system;

vii) Generating a "first PERNOB value-set" ($1^{st}$ $PERNOB_{(D1(PM1DM1))}$, $1^{st}$ $PERNOB_{(D1(PM1DM2))}$, $1^{st}$ $PERNOB_{(D1(PM2DM1))}$, or $1^{st}$ $PERNOB_{(D1(PM2DM2))}$) for each combination of prediction method-set and decision-making method-set (PM1/DM1, PM1/DM2, PM2/SM1, and PM2/DM2) based on the difference between each corresponding "first predicted benefit" ($B1_{(D1(PM1DM1))}$, $B1_{(D1(PM1DM2))}$, $B1_{(D1(PM2DM1))}$, or $B1_{(D1(PM2DM2))}$) and the "first perfect benefit" ($B1_{(D1(P))}$);

viii) Generating, using each prediction method-set (PM1 or PM2), a respective "second predicted value-set" (based on imperfect foreknowledge) for at least one state-variable(s) of the system model ($V2_{(PM1)}$ and $V2_{(PM2)}$), and running the model for a "second stage" of a "second time duration" starting as at "first actual stage" ($S1_{(A)}$) (not t=o); and thereby revealing for each prediction method-set the predicted availability of at least one system resource(s) and the predicted demand for same at least one system resource(s) for the "second stage";

ix) Based on each "second predicted value-set" ($V2_{(PM1)}$ or $V2_{(PM2)}$), using each "decision-making method-set" (DM1 or DM2) to generate a respective "second imperfect decision" ($D2_{(PM1DM1)}$, $D2_{(PM2DM2)}$, $D2_{(PM1DM2)}$, and $D2_{(PM2DM2)}$) as to how the at least one system resource(s) should be valuated and utilized;

x) Observing the actual system and the "second actual value-set" ($V2_{(A)}$) of the system through the "second stage", and thereby revealing for each prediction method-set the actual availability of the at least one system resource(s) and the actual demand for same at least one system resource(s) for the "second stage";

xi) Generating a "second perfect decision" ($D2_{(P)}$) based on the "second actual value-set" ($V2_{(A)}$) to best valuate and utilize the at least one system resource(s) that is actually available to optimise benefit from utilization of the at least one system resource(s);

xii) Implementing each "second imperfect decision" ($D2_{(PM1DM1)}$, $D2_{(PM2DM1)}$, $D2_{(PM1DM2)}$, or $D2_{(PM2DM2)}$) based on the corresponding "second actual value-set" ($V2_{(A)}$) (and not the "second predicted value-set" ($V2_{(PM1)}$ or $V2_{(PM2)}$)) of the system, and deducing respectively therefrom a resulting "second predicted benefit" ($B2_{(D1(PM1DM1))}$, $B2_{(D1(PM1DM2))}$, $B2_{(D1(PM2DM1))}$, or $B2_{(D1(PM2DM2))}$) for each "second imperfect decision" ($D2_{(PM1DM1)}$, $D2_{(PM2DM1)}$, $D2_{(PM1DM2)}$, or $D2_{(PM2DM2)}$);

xiii) Implementing the "second perfect decision" ($D2_{(P)}$) based on the "second actual value-set" ($V2_{(A)}$) of the system, and deducing therefrom a resulting "second perfect benefit" ($B2_{(D2(P))}$) and a "second actual state" ($S2_{(A)}$) of the system (if further stages are to be re-iterated) as at the end of the second stage;

xiv) Generating a "second PERNOB value-set" ($2^{nd}$ $PERNOB_{(D1(PM1DM1))}$, $2^{nd}$ $PERNOB_{(D1(PM1DM2))}$, $2^{nd}$ PERNOB$_{(D1(PM2DM1))}$, or 2$^{nd}$ PERNOB$_{(D1(PM2DM2))}$), for each combination of prediction method-set and decision-making method-set (PM1/DM1, PM1/DM2, PM2/SM1, and PM2/DM2) based on the difference between each corresponding "second predicted benefit" (B2$_{(D1(PM1DM1))}$, B2$_{(D1(PM1DM2))}$, B2$_{(D1(PM2DM1))}$, or B2$_{(D1(PM2DM2))}$) and the "second perfect benefit" (B2$_{(D1(P))}$).

Accordingly, the "first PERNOB value-set" (1$^{st}$ PERNOB$_{(D1(PM1DM1))}$, 1$^{st}$ PERNOB$_{(D1(PM1DM2))}$, 1$^{st}$ PERNOB$_{(D1(PM2DM1))}$, and 1$^{st}$ PERNOB$_{(D1(PM2DM2))}$) and "second PERNOB value-set" (2$^{nd}$ PERNOB$_{(D1(PM1DM1))}$, 2$^{nd}$ PERNOB$_{(D1(PM1DM2))}$, 2$^{nd}$ PERNOB$_{(D1(PM2DM1))}$, and 2$^{nd}$ PERNOB$_{(D1(PM2DM2))}$) generated using the method above for one combination of prediction method-set and decision-making method-set (PM1/DM1, PM1/DM2, PM2/SM1, and PM2/DM2) can be compared.

By comparing the "first PERNOB value-set" (1$^{st}$ PERNOB$_{(D1(PM1DM1))}$, 1$^{st}$ PERNOB$_{(D1(PM1DM2))}$, 1$^{st}$ PERNOB$_{(D1(PM2DM1))}$, and 1$^{st}$ PERNOB$_{(D1(PM2DM2))}$) and "second PERNOB value-set" (2$^{nd}$ PERNOB$_{(D1(PM1DM1))}$, 2$^{nd}$ PERNOB$_{(D1(PM1DM2))}$, 2$^{nd}$ PERNOB$_{(D1(PM2DM1))}$, and 2$^{nd}$ PERNOB$_{(D1(PM2DM2))}$), (and any further iterated PERNOB value-set(s) for additional stages), generated using a given combination of prediction method-set and decision-making method-set (PM1/DM1, PM1/DM2, PM2/SM1, and PM2/DM2), a resource manager would be able to systemically determine the combination that would maximise benefit in light of the particular situation.

Preferably, a "PERNOB value-set" is expressed as a relative measure (such as a ratio, percentage, or proportion) of deviation of the corresponding "imperfect benefit" from the "perfect benefit".

Preferred methods of comparison are comprised of statistical comparison of the statistical distributions of the respective PERNOB value-sets generated using different combinations of prediction method-set and decision-making method-set.

For each combination of a prediction method-set and a decision-making method-set (PM1/DM1, PM1/DM2, PM2/SM1, or PM2/DM2), an overall PERNOB value-set can also be deduced based on a function of the "first PERNOB value-sets" (1$^{st}$ PERNOB$_{(D1(PM1DM1))}$, 1$^{st}$ PERNOB$_{(D1(PM1DM2))}$, 1$^{st}$ PERNOB$_{(D1(PM2DM1))}$, or 1$^{st}$ PERNOB$_{(D1(PM2DM2))}$) and the "second PERNOB value-sets" (2$^{nd}$ PERNOB$_{(D1(PM1DM1))}$, 2$^{nd}$ PERNOB$_{(D1(PM1DM2))}$, 2$^{nd}$ PERNOB$_{(D1(PM2DM1))}$, or 2$^{nd}$ PERNOB$_{(D1(PM2DM2))}$). If the distribution of the PERNOB value-sets (especially when the number of iterated PERNOB value-sets is larger) is normal, then the overall PERNOB value-set can simply be the central tendency of the PERNOB value-sets (preferably with consideration of measure(s) of variance such as standard deviation if additional stages are assessed). However, when dealing with PERNOB value-sets (when more than two stages) of more complex distributions (e.g. multimodal), different functions and methods of comparison would need to be used accordingly (e.g. non-parametric statistical comparisons).

By using the foregoing methods, a resource manager would be able to select the combination of prediction method-set and decision-making method-set with a desired overall PERNOB value-set according to the situation. For example, implementation of decision(s) made using a combination (of prediction method-set and decision-making method-set) that yielded the lowest overall PERNOB value-set (assuming normal distribution) would often yield optimal benefits from the utilization of the resource. However, this is not necessarily always the case.

As aforementioned, resource managers are often required to model different time frames or time scales because of their need to consider and plan for both short and long-term predictions of resource availability and demand. In working with these different models, it is imperative that certain confounding inter-relationships between models (with different time-scales) are understood and accounted for. For instance, longer term predictions often have significant influence over shorter term predictions and decision-making, and of course, implementation of decisions-made regarding short term resource utilization can reciprocally and significantly impact on longer term predictions and decision-making. Further, a resource manager must also consider the level of error and inaccuracy that is inherently built in at the operational level (e.g. where decisions are implemented), regardless of however perfect a given prediction regarding future availability of or demand for a given resource.

Therefore, it is important to make sure that the method-sets (for prediction and for decision-making) that are used for predicting resource availability in the more distant future are comparable and compatible in terms of method bias and accuracy to the methods (for prediction and for decision-making) that are used for predicting resource availability in the near future.

As such, another object of the present invention is to provide a novel method based on PERNOB for systemic evaluation and selection of prediction and decision-making methods used between system models that involve different time-scales (i.e. different stages or time-step intervals). For the purpose herein, the methods of the present invention can be applied to all levels of planning involving time durations of the stages that can range from seconds, minutes, hours, weeks, months, and even multiple years) by considering uncertainties in a coherent fashion.

Figure 2:
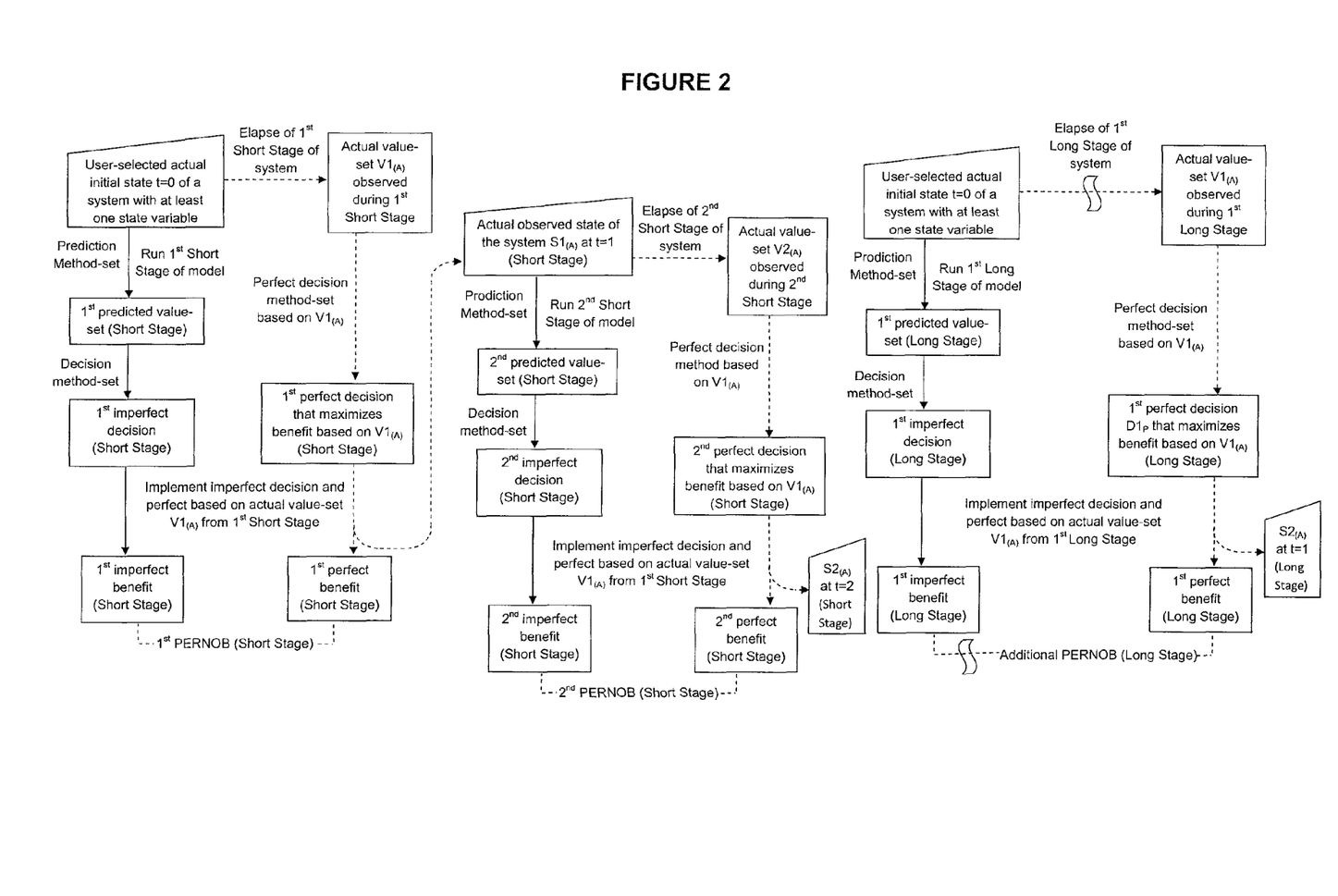
FIG. 2 is a diagrammatic representation depicting the determination of PERNOB values for a given prediction method-set and decision-making method-set combination over two short stages or time-steps (as example of a multi-staged model) vs. the determination of PERNOB value for a given prediction method-set and decision-making method-set combination over a longer stage or time-step.

According to another aspect of the present invention, and referring to FIG. 2, there is provided a method for systemic evaluation of prediction method-sets and decision-making method-sets used for differently staged resource planning models, wherein the evaluation method set forth in the first aspect (and FIG. 1) above is applied to a given combination of prediction method-set and decision-making decision-set over two stages (as depicted by the left and central portions of FIG. 2). Again, the two stages are illustrated only for ease of illustration, and the method can be used to generate PERNOB values for additional stage(s) of the model by re-iterating the described steps mutatis mutandis.

It should also be readily apparent to a skilled person in the art that each "prediction method-set" or "decision-making method-set" as mentioned may represent one prediction method or may comprise of more than one prediction method, and the "prediction method-set" or "decision-making method-set" used in one stage would not have to be the same as the "prediction method-set" or "decision-making method-set" used in another stage. Further, each "stage" as mentioned may represent one time step or time interval, or it may comprise multiple time steps or time intervals, and the time duration of different stages may be the same or it may be different.

For this example, and referencing the right portion of FIG. 2, at least one additional PERNOB value-set is also generated for at least one combination of prediction method-set and decision-making method-set by repeating the described steps for at least one stage, said stage(s) starting as at the user-selected "initial actual state" of the system (same or different to above) and each having a longer time duration than the "first time duration", the "second time duration", or the sum of "first time duration" and "second time duration" (and any reiterated stages that may be performed in addition thereto).

As per the foregoing, only one stage for this longer time duration is illustrated in FIG. 2 for ease of illustration.

Once the additional PERNOB value-set$_{(Long\ Stage)}$ is generated for the stage with different (e.g. longer) time duration, and before it can be meaningfully compared against the "first PERNOB value-set$_{(Short\ Stage)}$", the "second PERNOB value-set$_{(Short\ Stage)}$", or the "overall PERNOB value-set$_{(Short\ Stage)}$" (depending on situational requirement), it must first be pro-rated to a common time duration or unit as the "first time duration", the "second time duration", or the sum of "first time duration" and "second time duration", respectively.

As aforementioned, each "PERNOB value-set" is again preferably expressed as a relative measure (such as a ratio, percentage, or proportion) of deviation of the corresponding "imperfect benefit" from the "perfect benefit", and the preferred methods of comparison may comprise of statistical comparison of the respective PERNOB value-sets.

Once the PERNOB value sets are set for comparison, the combination of prediction method-set and decision-making method-set that yields the additional PERNOB value-set$_{(Long\ Stage)}$ that is most comparable (to the "first PERNOB value-set$_{(Short\ Stage)}$", the "second PERNOB value-set$_{(Short\ Stage)}$", or the "overall PERNOB value-set$_{(Short\ Stage)}$" (depending on situational requirement)) should be selected so that the "bias" of the prediction method-set and decision making method-set used for the "long stage" is matched and complementary to the ones used for the "short stage".

Alternatively, depending on situation and if "mismatched" combinations of prediction method-sets and decision making method-sets "must" be used for the different stages, the relative difference between the additional PERNOB value-set$_{(Long\ Stage)}$ vs. the "first PERNOB value-set$_{(Short\ Stage)}$", the "second PERNOB value-set$_{(Short\ Stage)}$", or the "overall PERNOB value-set$_{(Short\ Stage)}$", can instead be used to pro-rate or re-rate the output variables of the system, such as the quantity and/or the value of the at least one system resource(s). For example, in case of where there is a bias where the future use of a system resource is deemed more beneficial than the current use based on "long stage" modeling, the value of such resource must be pro-rated or re-rated (e.g. decreased) based on a function of the additional PERNOB value-set$_{(Long\ Stage)}$ vs. the "first PERNOB value-set$_{(Short\ Stage)}$", the "second PERNOB value-set$_{(Short\ Stage)}$", or the "overall PERNOB value-set$_{(Short\ Stage)}$", so that an unbiased decision can be made based on the adjusted value of the resource.

In summary, the major applications of the methods of the present invention are:

i) First, it can be used to determine the best prediction method if there are multiple competing methods; this is done by using a series of inputs and computing the average (or any other statistical measure can be used) PERNOB for individual prediction methods and decision-making methods and then choosing the optimal ones.

ii) Second, it can be used to create an unbiased operational decision making environment where the current, short term operational decisions are traded off against future decisions. In these cases a realistic valuation of system resources is necessary. For example, if that valuation was derived by perfect foreknowledge calculations, then PERNOB is necessary to pro-rate or re-rate (e.g. decrease) the associated benefits of the future use of the resource. Without this adjustment of the resource (inventory) valuation, there would a bias where the future use of the resource is always more beneficial than the current use.

All publications, patents and patent applications referred to herein are incorporated by reference in their entirety to the same extent as if each individual publication, patent or patent application was specifically and individually indicated to be incorporated by reference in its entirety.

Having illustrated and described the principles of the invention in a preferred embodiment, it should be appreciated to those skilled in the art that the invention can be modified in arrangement and detail without departure from such principles. The invention is to be considered limited solely by the scope of the appended claims.

The invention claimed is:

1. A computer-implemented method for evaluating at least one prediction and decision method set comprising a prediction method and a decision making method for staged resource planning and modeling of a system, the method comprising:

generating a first predicted value set comprising at least one state variable by applying the prediction method of said at least one prediction and decision method set to an initial state of the system for a first stage having a prescribed duration whereby the first predicted value set represents a predicted availability of at least one system resource and a predicted demand of at least one system resource for the first stage;

applying the decision making method of said at least one prediction and decision method set to the first predicted value set to generate a first imperfect decision as to how said at least one system resource should be utilized;

observing a first actual value set of the system through the first stage which represents an actual availability of said at least one system resource and an actual demand for said at least one system resource for the first stage;

determining according to the first actual value set a first perfect decision corresponding to a utilization of said at least one system resource which optimises benefit;

determining a first perfect benefit by the application of the first perfect decision to the first actual value set;

determining a first predicted benefit by application of the first imperfect decision of said at least one prediction and method set to said first actual value-set;

generating a first rating set for said at least one prediction and decision method set by comparing the first predicted benefit of said at least one prediction and decision method set to the first perfect benefit.

2. The method according to claim 1 wherein the first predicted value set and first imperfect decision are generated after the first actual value-set for the first stage has been observed.

3. The method according to claim 1 wherein said at least one prediction and decision method set comprises a plurality of prediction and decisions sets and wherein at least one of the prediction and decision method sets includes a prediction method which is different than another one of the prediction and decision method sets.

4. The method according to claim 1 wherein said at least one prediction and decision method set comprises a plurality of prediction and decisions sets and wherein at least one of the prediction and decision method sets includes a decision making method which is different than another one of the prediction and decision method sets.

5. The method according to claim 1 wherein the rating set is expressed as a relative measure of deviation of the imperfect benefit from the perfect benefit.

6. The method according to claim 1 wherein the first stage comprises one or more time step iterations of said at least one prediction and decision method set.

7. The method according to claim 6 wherein said at least one prediction and decision method set comprises a plurality of prediction and decision method sets, each being arranged to be executed a respective prescribed number of time step iterations during the prescribed duration of first stage and wherein all of the rating sets of the plurality of prediction and decision method sets are generated over a common prescribed duration of the first stage.

8. The method according to claim 7 wherein at least one of the plurality of prediction and decision method sets is arranged to be executed a different prescribed number of time step iterations during the first stage than another one of the plurality of prediction and decision method sets such that the prediction and decision method sets are pro-rated to the common prescribed duration of the first stage.

9. The method according to claim 1 wherein said at least one prediction and decision method set comprises a plurality of prediction and decision method sets and the method further comprises comparing the rating set of at least one of the prediction and decision method sets to the rating set of another one of the prediction and decision method sets.

10. The method according to claim 9 further comprising selecting the rating set with a lower magnitude to yield optimal benefits from the utilization of the resource.

11. The method according to claim 1 further comprising the steps of:
determining a first actual state of the system at the end of the first stage;
generating a second predicted value set comprising at least one state variable by applying the prediction method of said at least one prediction and decision method set to the first actual state of the system for a second stage having a prescribed duration whereby the second predicted value set represents a predicted availability of at least one system resource and a predicted demand of at least one system resource for the second stage;
applying the decision making method of said at least one prediction and decision method set to the second predicted value set to generate a second imperfect decision as to how said at least one system resource should be utilized;
observing a second actual value set of the system through the second stage which represents an actual availability of said at least one system resource and an actual demand for said at least one system resource for the second stage;
determining according to the second actual value set a second perfect decision corresponding to a utilization of said at least one system resource which optimises benefit;
determining a second perfect benefit by applying the second perfect decision to the second actual value set;
determining a second predicted benefit by applying the second imperfect decision of said at least one prediction and method set to said second actual value-set; and
generating a second rating set for said at least one prediction and decision method set by comparing the second predicted benefit of said at least one prediction and decision method set to the second perfect benefit.

12. The method according to claim 11 wherein the predicted value-sets and the imperfect decisions are generated after the second actual value set for the second stage has been observed.

13. The method according to claim 11 wherein the method further comprises generating an overall rating set based on a function of the first rating set and the second rating set for said at least one prediction and decision method set.

14. The method according to claim 13 wherein said at least one prediction and decision method set comprises a plurality of prediction and decisions sets and the method further comprises comparing the overall rating set of one prediction and decision method set to the overall rating set of another prediction and decision method set.

15. The method according to claim 14 wherein each rating set represents a difference between predicted and perfect benefits and wherein the method further comprises determining which one of the prediction and decision method sets has a lowest overall rating set to yield optimal benefits from the utilization of the resource.

16. The method according to claim 14 wherein the comparison comprises comparison of a statistical distribution of the overall rating set of one prediction and decision method set to a statistical distribution of the overall rating set of another prediction and decision method set.

17. The method according to claim 11 wherein said at least one prediction and decision method set comprises a plurality of prediction and decisions sets and the method further comprises determining which of the prediction and decision method sets has first and second rating sets which are most similar to one another over the first and second stages.

18. The method according to claim 17 wherein the determination of which of the prediction and decision method set has first and second rating sets which are most similar to one another includes comparing a measure of central tendency of one rating set to a measure of central tendency another rating set.

19. The method according to claim 11 wherein said at least one prediction and decision method set comprises a plurality of prediction and decision method sets and the method further comprises statistically comparing a central tendency and variance of the rating sets of different prediction and decision method sets to one another.

20. The method according to claim 11 wherein said at least one prediction and decision method set comprises a plurality of prediction and decision method sets, each being arranged to be executed a respective prescribed number of time step iterations during the prescribed duration of first stage and wherein all of the rating sets of the plurality of prediction and decision method sets are generated over a common prescribed duration of the first stage and the second stage.

* * * * *